Oct. 7, 1930.   C. E. DELLENBARGER   1,777,294
METHOD OF AND APPARATUS FOR KNEADING AND MIXING
Filed Dec. 18, 1924   3 Sheets-Sheet 1
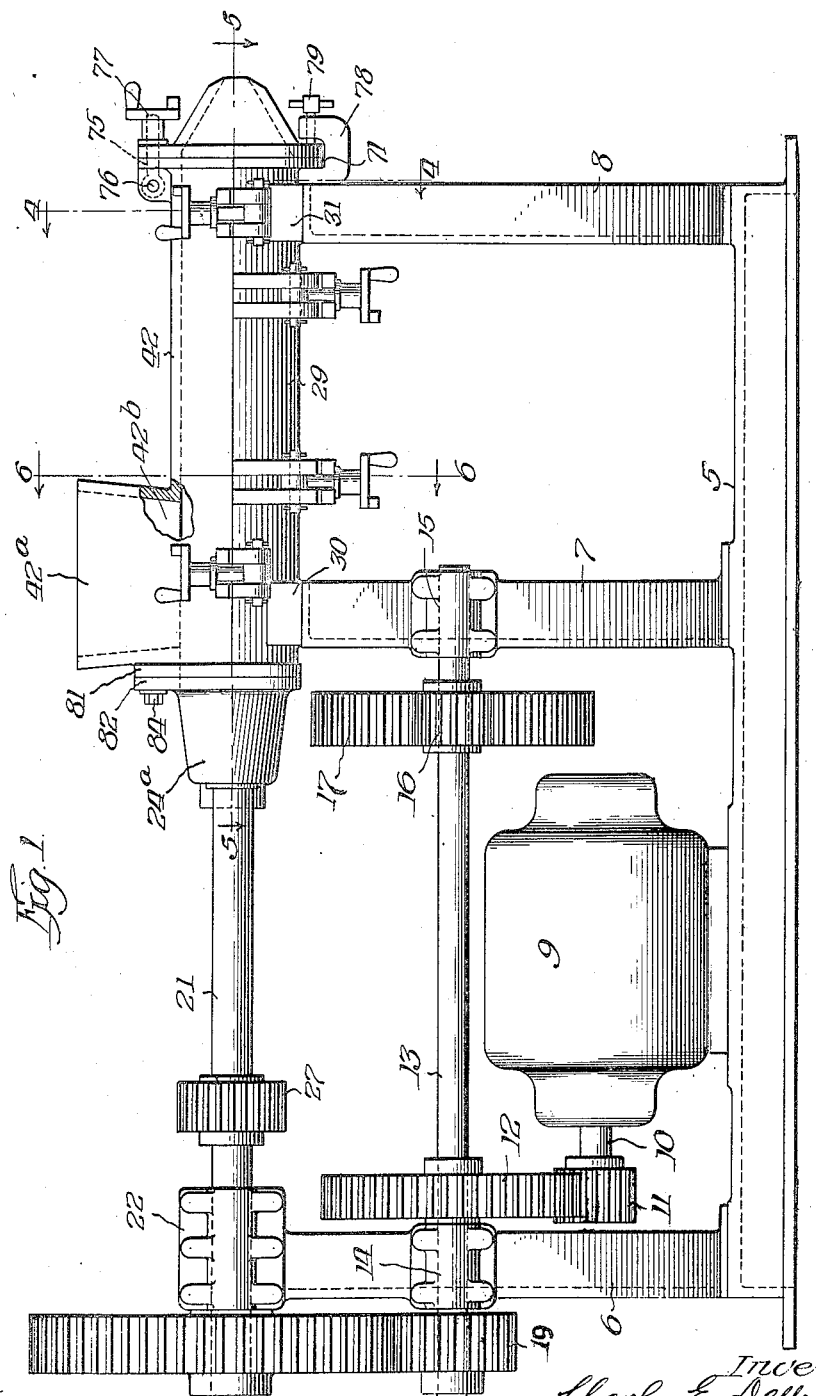

Oct. 7, 1930.    C. E. DELLENBARGER    1,777,294
METHOD OF AND APPARATUS FOR KNEADING AND MIXING
Filed Dec. 18, 1924    3 Sheets-Sheet 2
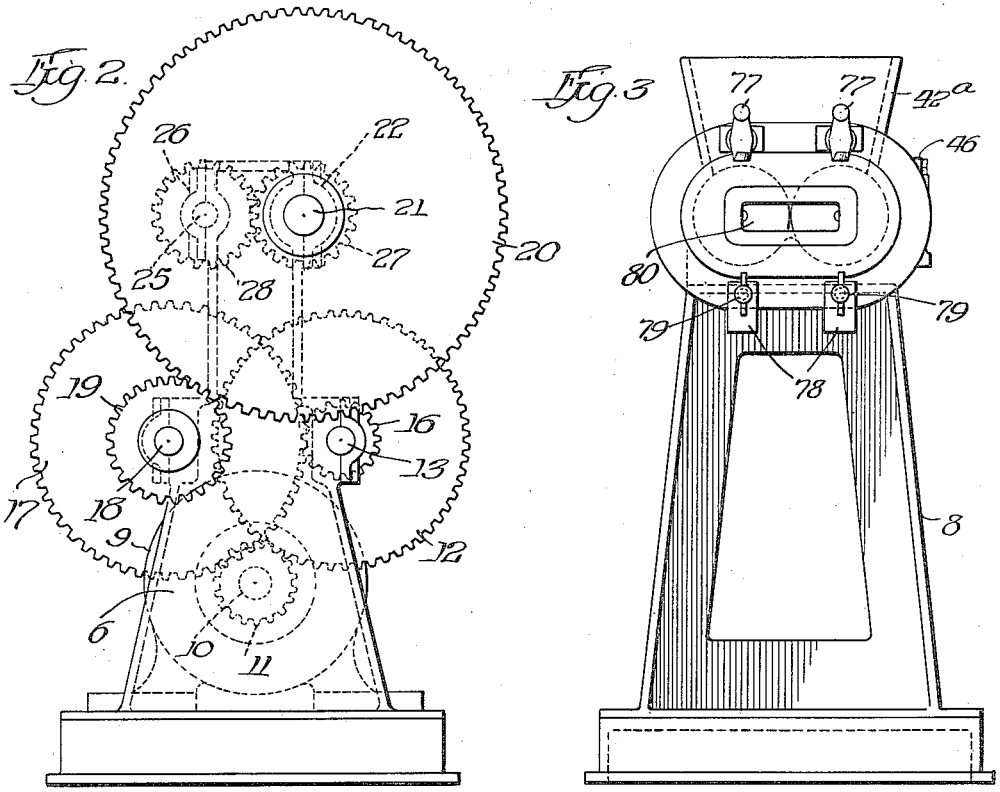
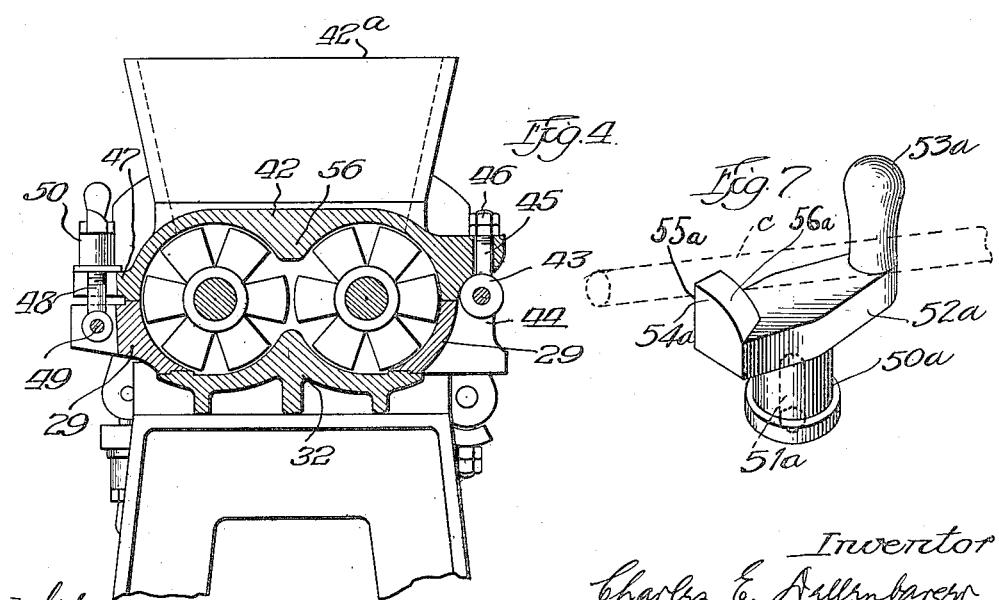
Inventor
Charles E. Dellenbarger
By attorney
Paul Carpenter
Witness:

Oct. 7, 1930.　　C. E. DELLENBARGER　　1,777,294
METHOD OF AND APPARATUS FOR KNEADING AND MIXING
Filed Dec. 18, 1924　　3 Sheets-Sheet 3
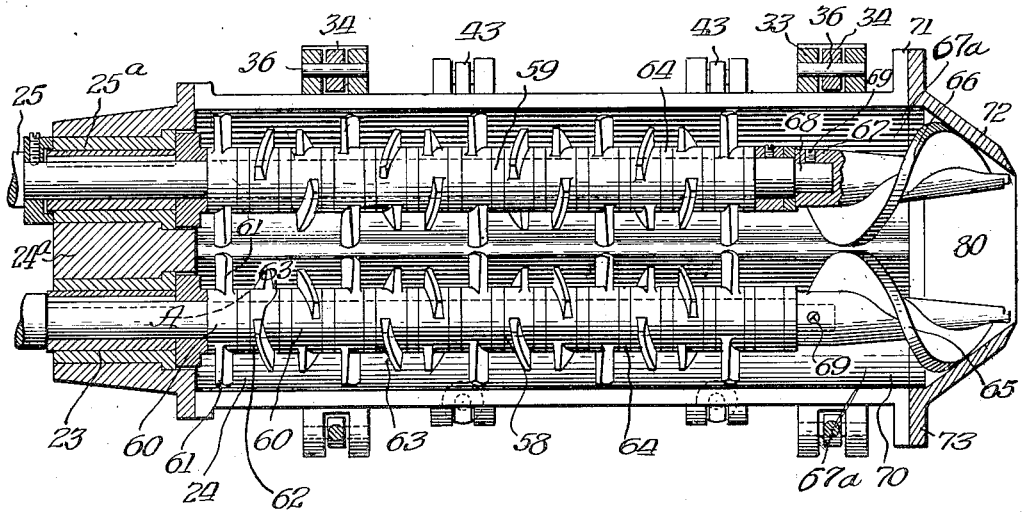
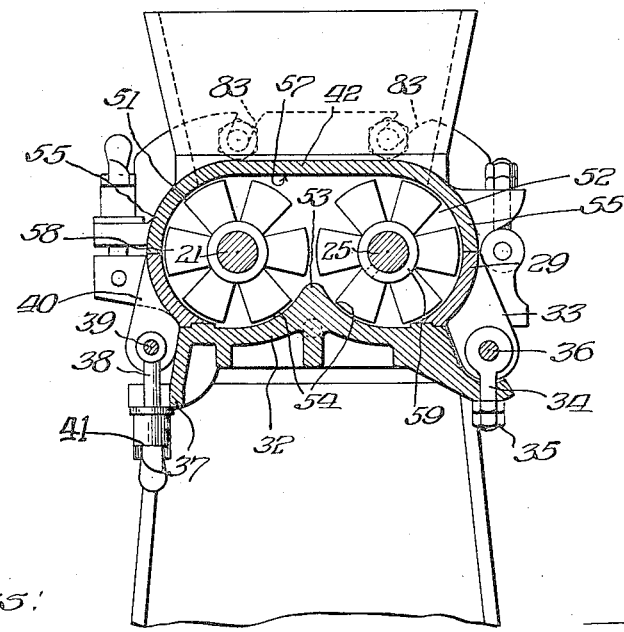
Witness:
Inventor
Charles E. Dellenbarger
by attorney Patented Oct. 7, 1930

1,777,294

UNITED STATES PATENT OFFICE

CHARLES E. DELLENBARGER, OF PHILADELPHIA, PENNSYLVANIA

METHOD OF AND APPARATUS FOR KNEADING AND MIXING

Application filed December 18, 1924. Serial No. 756,739.

This invention relates broadly to the handling and conversion of materials and more particularly includes improvements in a method of and apparatus for kneading, mixing and delivering plastic material, such as chewing gum and the like, and While, for the sake of convenience in description, the invention is illustrated in an apparatus for the purpose of mixing and kneading chewing gum, it will be understood that the invention finds, both in the method and in the apparatus, a wide field of utility for other purposes.

In the manufacture of chewing gum, the gum material is usually cooked in kettles at the melting temperature of the bases or raw gum used in the compound, and at this temperature the material is usually too soft to secure mechanical working which produces smooth consistency and the velvety character of the gum which is desirable.

One of the functions or purposes of subjecting the gum to a kneading step subsequent to removal from the cooking kettles is for the reason that during cooking a quantity of air enters the material and becomes entrapped therein, which produces an oxidation of the flavors and bases of the gum, causing it to become stale and sometimes bitter.

This invention finds particular utility in connection with the manufacture of chewing gum, especially due to the fact that this material in a plastic state is sticky and when attempts to mix or knead such material in apparatus of the prior art known to me have been made, difficulty is encountered to exclude the entrapped air therefrom, and also in cleaning the apparatus after a kneading operation has been completed or when the plant shuts down for a time, a considerable loss of time, material and labor being caused by these faults.

It has also been difficult to mechanically work the gum due to the fact that the kneading, that is, agitation of the gum, is in most of the devices of the prior art improperly carried out, and in many instances it has been necessary to run the material between rollers in an attempt to remove the air, with more or less unsatisfactory results.

With the limitations and disadvantages of the prior art devices in mind, this invention includes as its principal objects and advantages, the provision of an improved method of and apparatus for mixing, kneading and delivering plastic materials; the provision of an improved apparatus for mixing, kneading and removing the entrapped air from plastic materials; the provision of an improved method of continuously kneading plastic materials; the provision of an improved method of and apparatus for kneading, mixing, and delivering in uniform shape a mass of plastic material; the provision of an improved method of and apparatus for kneading and mixing material and delivering the same in substantially uniform quantity; the provision of an improved method of and apparatus for mixing, kneading and delivering material at a substantially continuous rate of speed and in uniform shape; the provision of an improved method of and apparatus for kneading and mixing material and for removing entrapped air therefrom, characterized by the provision of means whereby complete removal of the material is effected; the provision of an improved method of and apparatus for mixing and delivering in predetermined shape a quantity of plastic material; the provision of an improved method of and apparatus for mixing and delivering continuously in predetermined quantity and at a predetermined rate of speed a quantity of material in a desired shape, and for removing the entrapped air from such material; and the provision of an improved method of and apparatus for increasing the density of a plastic material.

This invention further is characterized by the provision of an apparatus which embodies a convenient and an accessible design facilitating cleaning and removal of the parts of the machine; the provision of an apparatus of the character described characterized by interchangeability of the parts thereof; the provision of an improved mixing and propelling mechanism; the provision of an improved mixing and propelling mechanism of a duplex construction; the provision of an improved mixing and delivering apparatus in which the propelling and mixing elements thereof each constitute substantially an interrupting helix; the provision of an improved apparatus of the character described including a mixing chamber, and multiple mixing and propelling elements therein; the provision of an improved apparatus of the character described including an improved mixing chamber comprising separable parts rendering the interior thereof readily accessible; the provision of an improved apparatus which includes a multipart mixing chamber, and multiple mixing elements therein; the provision of an improved mixing and propelling apparatus including an improved shaping element; the provision of an improved apparatus of the character described which includes oppositely moving cooperating propelling elements and a shaping device; and the provision of a device of the character described which is compact and simple in construction and efficient in operation.

The foregoing and such other objects and advantages as may hereinafter appear or be pointed out as this description proceeds, are attained in the structural embodiment of the invention illustrated in the accompanying drawings, in which:

Figure 1 is a side elevational view of an apparatus embodying the improvements of this invention;

Figure 2 is an end elevational view viewing the same from the left hand side of Figure 1;

Figure 3 is an end elevational view viewing the apparatus from the right hand side of Figure 1;

Figure 4 is a fragmentary vertical sectional view taken on the line 4—4 of Figure 1, looking in the direction indicated by the arrows;

Figure 5 is a horizontal longitudinal sectional view taken on the line 5—5 of Figure 1, looking in the direction of the arrows;

Figure 6 is a transverse vertical sectional view taken on the line 6—6 of Figure 1, looking in the direction indicated by the arrows; and Figure 7 is an enlarged perspective view of a detail part.

The method involved in this invention and which primarily is intended to work a quantity of plastic material similarly to working of such material by hand, such as by kneading, includes working of the material by interfolding or overlapping a portion of the material upon another portion thereof and simultaneously therewith propelling the material in a predetermined direction.

For mechanical convenience in carrying out the method, the function is performed in a substantially closed chamber, preferably as far as possible free from outside air, and concurrently with the simultaneous steps of mixing and propelling, an ejection of the material mixed and propelled in such chamber is accomplished, and upon ejection of the material the shape which it is desired to give to such material is imparted thereto, that is, the material may be ejected in the form of a sheet, a cylinder or any other shape convenient for future handling.

In carrying out the method above outlined, the step of mixing by overlapping of each portion of the material serves to not only increase the density of the material by forcing the particles thereof together but also serves to force entrapped air from the material so that when the mass of material passes from the mixing and kneading operation to the ejection step, it possesses no pockets which might contain air which would eventually cause the material to deteriorate. I have found that in carry out this method and in the embodiment of the apparatus to be hereinafter described, that a substantially molecular mixing takes place and this, I believe, to be one of the greatest factors in the commercial success of the method.

For convenience, I find it expedient to employ the apparatus shown in the accompanying drawings, and referring now more particularly to the drawings, and first to Figures 1 and 2, I provide a base 5 on which the vertical standards 6, 7 and 8 are rigidly mounted, an electric motor or other source of power 9 being mounted on the base between the standards 6 and 7.

The armature shaft 10 of the motor carries a pinion 11 which meshes with a gear 12, fixedly mounted upon the jack shaft 13. The shaft 13 is mounted in suitable bearings 14 and 15 on the standards 6 and 7 and is provided with a pinion 16 near the bearing 15 which meshes with a gear 17 mounted on a counter shaft 18, parallel with the shaft 13 and mounted in suitable bearings on the other side of the standards 6 and 7.

The shaft 18 carries a pinion 19 (see Figure 2) which meshes with a large gear 20 mounted on the outer end of one of the mixer shafts 21, such shaft 21 being mounted in a suitable bearing 22 on the top of the standard 6 and at the other end, said shaft 21 disposed in a bearing 23 in one end of the mixed chamber or casing 24.

The other mixer shaft 25, parallel with, but spaced from, shaft 21 is mounted in a suitable bearing 26 on the standard 6 adjacent to the shaft 21 and the pinions 27 and 28 on said shafts 21 and 25, respectively, are in meshing engagement and thus the two shafts 21 and 25 are simultaneously driven in opposite directions at the same speed.

The mixing device of this invention includes the casing 24, which comprises a base portion 29 suitably rigidly supported at 30 and 31 on the top portions of the standards or pedestals 7 and 8.

A portion of the base 29 is removable as indicated at 32, said portion 32 being hingedly mounted in lugs 33 formed on the base 29, by the provision of I-bolts 34, retaining nuts 35, said I-bolts being receivable between the pairs of lugs 33 and mounted on studs 36.

The bottom portion 32 is held in closed position by the provision of a plurality of bifurcated lugs 37, links 38 extending between said lugs and pivoted at 39 on the lugs 40, locking members 41 being pivoted to the links and underlying the lugs 37 for retaining the bottom in closed position.

The top of the casing is removable and comprises a portion 42 which is hingedly mounted at 43—43 upon the bottom portion 29, by the provision of lugs 44 on said bottom portion, I-bolts 45 and retaining nuts 46. For retaining the top portion in closed position, a plurality of bifurcated lugs 47 are provided thereon, and threaded bolts 48 pivoted at 49 on the bottom portion 29 are provided, said bolts lying in said lugs 47 and nut members 50 are threaded onto the bolts 48 overlying the lugs 47 and thereby retaining the top portion in closed position. The nuts 50 are constructed as best shown in Figure 7, wherein the nut includes a shank portion $50^a$, provided with an axial threaded opening $51^a$, terminating short of the upper end of the nut. A lateral head $52^a$ is formed upon said nut and is provided with a crank or handle $53^a$ at one end and an up-standing abutment $54^a$ at the opposite end. One side $55^a$ of said abutment is normal to the upper face of the head $52^a$, the other side $56^a$ is inclined. As the nut screws down by clockwise motion, it is tightened by hand, and may be quickly released by placing a bar or stick as shown in dotted lines at C in Figure 7. The inclined wall $56^a$ prevents use of a lever or stick for tightening and thus renders the clamps foolproof, but at the same time permitting quick release.

It will be observed that the top and bottom portions may thus be completely opened leaving but a small portion of the wall of the casing fixed which renders the interior of the device readily accessible for repair and cleaning.

As viewed in Figure 6, the casing in cross section corresponds substantially to a pair of cylinders contiguously arranged, forming chambers 51 and 52, the bottom 32 having its inner surface formed with a partition 53, the opposite sides 54—54 forming a continuation of the circular outer wall 29 so that with the walls 54, portion 29 and curve portions 55—55 of the top 42, substantially two cylindrical chambers are afforded.

Adjacent to the discharge end of the casing 24, the inner surface of the top 42 is provided with an enlarged portion 56, corresponding to the partition 53 and complemental thereto, but the major portion of the inner surface of the top 42 is horizontal as at 57, Figure 6, and thus tangential to the inner cylindrical surfaces of the casing.

The shaft 25 is mounted in a bearing $25^a$ and in the rear end wall $24^a$ of the chamber 24, and both of the shafts 21 and 25 extend into the two chambers 51 and 52 of the casing 24, in order to receive the kneading and propelling elements.

The kneading and propelling elements are illustrated best in Figures 4, 5 and 6, and are generally indicated at 58 and 59, and as they are substantially identical in construction but reversely arranged, I will described but one of the same.

Referring to the propelling device 58, it will be observed that the same includes a plurality of hub portions 60, each provided with a pair of radial blades 61, which are disposed with their axes in a plane diagonal to the transverse axes of the shaft on which the hub is mounted to afford the proper pitch. The adjoining hub such as indicated at 62 is so assembled on the shaft 21 that the blades 63 carried thereby are at an angle of substantially 60 degrees with respect to the blades 61, and this arrangement is carried throughout the propelling device to its outer end. By virtue of this arrangement and the angularity of the blades, it will be observed that they form substantially an interrupted helix and that a spiral line drawn around the propelling device will pass through first one of the blades 61, then a blade at 60 degrees to the blade 61 and then to the next blade at 60 degrees thereto, as indicated by the dotted line A in Figure 5. There will thus be at least one complete helix formed, and as viewed from an end (Fig. 6) the blades will be observed as six to the complete circumference, that is, a blade every 60 degrees.

Suitable spacing bushings 64—64 are placed between adjacent hubs 60 and 62 for properly spacing the units of the propelling devices.

Adjacent to the outer ends of the propelling devices 58 and 59, but at a point within the discharge outlet of the casing 24, I provide, on each of said propelling devices, and driven by the shafts 21 and 25, ejecting screws 65 and 66, which may be substantially continuations of the blades, that is, the pitch of the screws 65 and 66, at their inner ends, may be substantially the same as the pitch of the blades, although this is not absolutely essential. The screws are provided with sockets 67, as indicated at the upper right portion of Figure 5, for receiving the reduced ends 68 of the shafts on which they are mounted, the screws 69 serving to hold the screw members in proper position on said shafts 21 and 25.

The casing, at its discharge end, which is designated 70, is provided with a flange 71 and an outlet member of any desired shape indicated at 72 is detachably secured to said flange 71 by the provision of a flange 73 which latter is formed with notches (not shown) for receiving links 75 pivoted at 76 to the top portion 42 of the mixing chamber. Cam members 77 are pivoted on the outer ends of the links 75, and yokes 78 embrace the lower portion of the flanges 71 and 74 and are provided with clamping screws 79 which engage the flange 73, as best shown in Figures 1 and 3. The ejecting screws 65 and 66 substantially completely fill the outlet so that no material is left adhering to the walls thereof.

As shown in the drawings, the discharge member 72, which serves to shape the material as it issues from the kneading chamber, is tapered and is provided with an elongated opening 80 so that the material issuing from the mixer takes a substantially sheet or bar form. By varying the shape of the opening 80, that is, by substituting outlet members having openings of different shapes, I am enabled to vary the shape of the material discharged.

Material is deposited in the mixing chamber through a hopper 42ª, which is cast integrally with the top member 42 and is provided with an outlet opening 42ᵇ in the mixing chamber.

In order to more rigidly secure the mixing chamber top portion 42 in position and to further prevent any leakage, a flange 81 is provided on said top portion 42 and is complemental with a flange 82 formed on the end wall 24ª, said flange 82 being provided with inclined slots 83—83 which are adapted to receive retaining bolts 84 carried by the flange 81.

In the operation of the device, the mixing and propelling devices 58 and 59, driven by the motor 9, are caused to rotate in opposite directions, and in view of this, the blades of the propelling and mixing devices are oppositely pitched. In the present instance, the propelling device 58 rotates in a clockwise direction, and the propelling device 59 in a counter-clockwise direction, which tends, by means of the blades, to grasp the material deposited in the hopper 42ª and move it downwardly between the blades and the inner surfaces of the chambers 51 and 52 and this operation is repeated, dividing and folding and again dividing and folding the material upon itself in the mixer. The pitch of the blades causes the material to proceed through the chambers 51 and 52 and until it reaches the screws 65 and 66, whereupon the material is expelled through the outlet opening 80.

From an inspection of Figure 5 it will be seen that a substantially annular space 67ª is afforded between the outermost end blades and the outlet member 72, the function of this space being to arrest or retard discharge of the mass of material so that it is caused to move around with the screws 65 and 66, thus thoroughly kneading the material prior to issuance from the outlet. Thus it will be seen that the propelling devices serve to thoroughly mix the materials and propel it toward and through the outlet, and that the material is completely kneaded in the space 67ª, the blades of the propelling devices and the screws 65 and 66 cooperating for this purpose.

Having thus described my invention and illustrated it use, what I claim as new and desire to secure by Letters Patent is:

1. In an apparatus of the character described, in combination, a chamber having an inlet and a constricted portion terminating in an axial outlet, parallel revoluble primary mixing and propelling elements for a plastic material in said chamber in spaced relationship located on each side of the longitudinal axis thereof and terminating short of said constricted portion, and revoluble auxiliary propelling and compressing elements at said constricted portion coaxial with said primary propelling elements and constructed and arranged to substantially fill said constricted portion and thereby tending to retard the propulsion of and compress the material transversely of the axis of movement just prior to its discharge at said outlet.

2. The combination of a chamber adapted to convey a plastic material including complemental parallel spaced trough members communicating with each other for substantially their entire length and provided with constricted portions forming a common outlet, propelling means in each of said trough members, and auxiliary ejection means associated with said propelling means and constructed and arranged in said constricted portions for compressing the plastic material transversely of the axis of propulsion just prior to discharge at said outlet.

3. In an apparatus of the character described, in combination, a chamber having an inlet and a constricted portion terminating in an axial outlet, parallel revoluble primary mixing and propelling elements for a plastic material in said chamber in spaced relationship located on each side of the longitudinal axis thereof and terminating short of said constricted portion, and revoluble auxiliary propelling and compressing elements at said constricted portion coaxial with said primary propelling elements, and having a different pitch whereby to retard the propulsion of and compress the material transversely of the axis of propulsion just prior to its discharge at said outlet.

4. In a device of the character described, in combination, a casing having a constricted portion forming an outlet, propelling and mixing means in said casing, and auxiliary propelling means arranged in said constricted portion engaging the inner surface thereof for temporarily retarding the discharge of material from said outlet.

5. In an apparatus of the character described, in combination, a chamber having an inlet and having a constricted portion terminating in an axial outlet, mixing and propelling means in said chamber for a plastic material including a pair of spaced series of radially disposed spaced blades forming substantially parallel interrupted helixes operating to propel the material and produce a continuous kneading and expulsion of free air therefrom, and revoluble screw elements axially alined with said helixes and located in said constricted portion and constructed and arranged for tending to move the material toward the central axis of the chamber while propelling the same to said outlet so as to reduce the rate of movement of and compress the material and further exclude free air therefrom prior to discharge.

6. In an apparatus of the character described, in combination, a chamber having an inlet and having a constricted portion terminating in an axial outlet, mixing and propelling means in said chamber for a plastic material including a pair of spaced series of radially disposed spaced blades forming substantially parallel interrupted helixes operating to propel the material and produce a continuous kneading and expulsion of free air therefrom, and revoluble screw elements axially alined with said helixes and located in said constricted portion and having convolute substantially uninterrupted blades whose external edges in part engage the wall of said constricted portion for tending to move the material toward the central axis of the chamber while propelling the same to said outlet so as to compress the material and further exclude free air therefrom prior to discharge.

7. The method of substantially continuously mixing and propelling an inherently resilient and tacky material, which includes continuously propelling and mixing a mass of such material in a substantially closed chamber against resistance therein, temporarily retarding forward lineal movement of the mass of moving material by confining same temporarily in a chamber of reduced cubical dimension while continuing the rotative movement of the material whereby to compress the resilient mass transversely of its lineal path of movement and thus render the same more homogeneous, and subsequently discharging the material in a substantially uninterrupted mass.

8. In an apparatus of the character described, the combination of a substantially cylindrical casing, a constricted outlet at one end of said casing having tapering inner wall, propelling and mixing means in said casing including blades forming substantially a plurality of interrupted helixes operating to produce a continuous kneading of the material and lineal movement of the mass of material toward said outlet, and an auxiliary propelling means in said outlet and conforming to the inner contour thereof for causing a transverse component of force to be exerted on the mass of moving material to thus retard and compress it just prior to discharge from said outlet.

9. In a device of the character described, in combination, a chamber having an inlet and a constricted outlet, propelling and mixing means in said chamber, and means adjacent to said outlet acting independently of said propelling and mixing means compressing the mass of material toward the axis of movement through the mixer for rendering more homogeneous and kneading the mass of material just prior to and during discharge from the outlet.

In testimony whereof I have hereunto signed my name.

CHARLES E. DELLENBARGER.